United States Patent
Moulton et al.

(10) Patent No.: US 7,523,858 B2
(45) Date of Patent: Apr. 28, 2009

(54) DEVICE AND METHODS FOR SECURE TRANSACTIONS

(76) Inventors: Dennis Michael Moulton, 9304 157th PL NE., Redmond, WA (US) 98052; Gabriel Steven Trif, 7419 SE. Woodstock Blvd., Portland, OR (US) 97206; Neilkumar Murli Daswani, 4300 The Woods Dr., Apt. 1000, San Jose, CA (US) 95136

( * ) Notice: Subject to any disclaimer, the term of this patent is extended or adjusted under 35 U.S.C. 154(b) by 368 days.

(21) Appl. No.: 11/328,717

(22) Filed: Jan. 9, 2006

(65) Prior Publication Data
US 2006/0169767 A1 Aug. 3, 2006

Related U.S. Application Data

(60) Provisional application No. 60/641,982, filed on Jan. 7, 2005, provisional application No. 60/685,424, filed on May 27, 2005.

(51) Int. Cl.
*G06K 5/00* (2006.01)
(52) U.S. Cl. .................................. 235/380; 235/379
(58) Field of Classification Search ............... 235/380, 235/382, 449, 451, 492, 493, 379
See application file for complete search history.

(56) References Cited

U.S. PATENT DOCUMENTS

| | | | | |
|---|---|---|---|---|
| 5,221,838 A * | 6/1993 | Gutman et al. | ............... | 235/379 |
| 5,541,985 A * | 7/1996 | Ishii et al. | ................... | 379/111 |
| 5,748,737 A * | 5/1998 | Daggar | ........................ | 705/41 |
| 6,131,811 A * | 10/2000 | Gangi | ........................ | 235/380 |
| 6,293,462 B1 * | 9/2001 | Gangi | ........................ | 235/380 |
| 6,715,679 B1 * | 4/2004 | Infosino | ..................... | 235/449 |
| 6,817,521 B1 * | 11/2004 | Matada | ........................ | 235/380 |
| 2001/0013551 A1 * | 8/2001 | Ramachandran | ....... | 235/472.02 |
| 2001/0045454 A1 * | 11/2001 | Gangi | ........................ | 235/380 |
| 2002/0095580 A1 * | 7/2002 | Candelore | ................... | 713/178 |
| 2002/0147653 A1 * | 10/2002 | Shmueli et al. | ............... | 705/26 |
| 2003/0101137 A1 * | 5/2003 | Wronski, Jr. | .................. | 705/44 |
| 2003/0106935 A1 * | 6/2003 | Burchette | .................... | 235/380 |

\* cited by examiner

*Primary Examiner*—Daniel A Hess
*Assistant Examiner*—Paultep Savusdiphol
(74) *Attorney, Agent, or Firm*—Silicon Forest Patent Group; Paul J Fordenbacher, Esq.

(57) ABSTRACT

Embodiments of the present invention provide users with apparatus and methods for managing user data and for making and accepting payments. A system for enabling secure payment transactions comprises user hardware, recipient hardware, and a data system, in accordance with an embodiment of the present invention. The data system comprises a database and a database manager. The database includes storage means adapted to store user data. The database manager is adapted for controlling and managing access to the data in the database. The database manager is adapted for communication with the user hardware, recipient hardware, and the payment processing space, including financial institutions and other suppliers of data.

4 Claims, 8 Drawing Sheets

DEVICE AND METHODS FOR SECURE TRANSACTIONS

RELATED APPLICATIONS

This application claims priority from U.S. Provisional Application Ser. No. 60/641,982, filed Jan. 7, 2005, and U.S. Provisional Application Ser. No. 60/685,424, filed May 27, 2005, the contents of which are hereby incorporated by reference as if recited in full herein for all purposes.

FIELD

The present invention is related to financial and identification apparatus and methods, and more particularly, to apparatus and processes for transaction authentication and processing.

BACKGROUND

Many individuals today carry more than one credit card, in addition to a debit/check card and numerous perk/loyalty program cards. Combined with numerous receipts, a driver's license, and a few photos, the wallet of today can be quite a burdensome load. The bottom line is that today's wallet is not practical for the cashless, wireless, and paperless world of tomorrow. In addition, credit cards are not completely secure. Financial losses associated with credit card identity theft cost merchants, consumers, and financial institutions were in the billions of dollars in 2003. The problem is two fold; credit cards are not secure if they are lost and/or if someone else gets the account numbers. Credit card and identity theft is a prevalent threat to a person's security in today's society.

Excluding cash transactions, commerce today involves selecting a financial institution with which you are a member and using their designated card, check, and other instruments of payment to make a purchase. The user is in essence authorizing the transfer of funds from one account to another in exchange for goods or services. These instruments of payment simply allow the authorization of a transfer of funds and in no way provide the user with information as to the status of their account beyond an approval or denial by a point of sale (POS) terminal.

Credit and debit cards, plastic cards with magnetic strips, have in large part replaced writing checks for purchases. An inherent problem with these cards are that they are only capable of storing one financial institution's accounts and thus people are required to carry a card for each of the financial institutions in which they hold accounts. Also, these cards contain user identification and account information in visible format and in electronic format that is susceptible to fraudulent use. The visible format is the common raised and printed user name and account number.

Internet transactions are becoming increasingly accepted as the viable and most secure form of payment available. Internet transactions can be accomplished in real-time and use a more secure form of validation and authentication as compared to a traditional POS payment. While a POS payment requires a signature and/or a PIN number, an internet transaction can verify account name and address along with a security code found on the back of the physical card.

Online financial databases are currently in place for electronic commerce (e-commerce) transactions. These databases have proved to be an effective method of payment for person to person transactions such as those occurring on auction sites as compared with checks and money orders. A database of accounts allows the user the freedom to select which institution they would like to pay debts with. These databases have proven to be a secure and efficient way to promote commerce over the internet.

What is needed in the art is an instrument of payment that as convenient as a credit card but is free of visible identification that can be used fraudulently by another. Further, what is needed is a payment authentication method that provides the account holder access to account information and the ability for the account holder to selectively authenticate specific financial transactions.

BRIEF DESCRIPTION OF THE DRAWINGS

Like reference numbers generally indicate corresponding elements in the figures.

DETAILED DESCRIPTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention.

In the description reference is made to a payment. A payment is defined and used herein as a general term for the transfer of funds. Payments include, but not limited to, credit card transactions, debit card transactions, automated Clearing House (ACH) electronic funds transfer, electronic benefits transfer (EBT), stored value instruments transactions, coupons, and loyalty program transactions.

In the description reference is made to payment processing space. Payment processing space can be thought of as the various layers of a payment process. These layers include, but are not limited to, the merchant bank (also known as the acquiring bank), issuing bank (the entity that issues the credit card), network (the proprietary network on which the transaction data is communicated, including payment gateways), payment processor (the entity that serves as front end to the merchant), and the payment gateway (an entity who takes payment requests from the merchant and routes the request to the correct processor).

Figure 1:
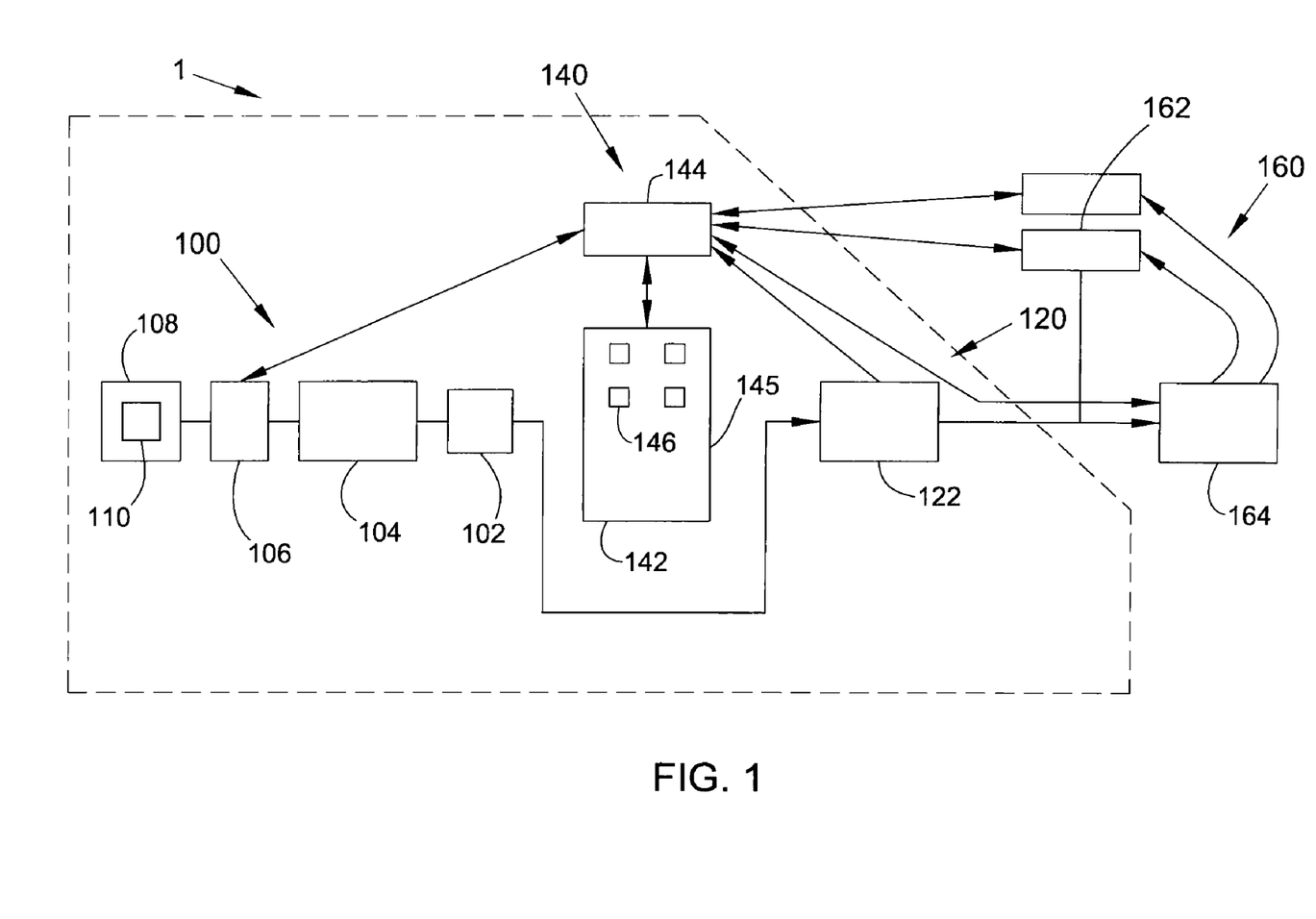
FIG. 1 is a schematic of a system for enabling secure payment transactions comprising user hardware, recipient hardware, and a data system, in accordance with an embodiment of the present invention.

Embodiments of the present invention provide users with apparatus and methods for managing user data and for making and accepting payments. FIG. 1 is a schematic of a system 1 for enabling secure payment transactions comprising user hardware 100, recipient hardware 120, and a data system 140, in accordance with an embodiment of the present invention. The data system 140 comprises a database 142 and a database manager 144. The database 142 includes storage means 145 adapted to store user data 146. The database manager 144 is adapted for controlling and managing access to the data 146 in the database 142. The database manager 144 is adapted for communication with the user hardware 100, recipient hardware 120, and the payment processing space 160, including financial institutions 162 and other suppliers of data 164.

The user hardware 1100 comprises a data storage device 102, a programmer device 104, a communications device 106, a display device 108, and a user interface 110. The data storage device 102 is adapted for storing data written/programmed thereon in a readable format by the programmer device 104. The programmer device 104 is adapted for writing and rewriting data to the data storage device 102, and in another embodiment, read data from the data storage device 102.

The data storage device 102 includes one of many types of devices that are known in the art that are adapted to store digital data written/programmed to it in a readable format by a programmer device and for reading the stored data by a data storage device reader. Data storage devices 102 known in the art include, but are not limited to, magnetic stripe cards, memory chip-containing smart cards, Universal Serial Bus (USB) storage devices, radio frequency identification (RFID)-equipped storage devices, personal digital assistants (PDA), personal computers, among others.

A known data storage device 102 used in merchant transactions, among others, is a magnetic stripe card. The magnetic stripe card is a thin card with a magnetizable stripe. The magnetic stripe card is currently popular for use, such as, but not limited to, as credit cards, debit cards, identification cards, perk cards, and library cards. The magnetic stripe card may be read by data storage device readers 122 including merchant terminals, such as point-of-sale (POS) terminals, buy swiping the magnetic stripe card through the terminal so that the magnetic stripe may be read by a magnetic read head of the terminal, a process known in the art.

The programmer device 104 is any device suitable for the particular purpose for writing and rewriting data to the data storage device 102. The programmer device 104 may also have the functionality of reading data from the storage device 102. Known programmer devices 102 include, but are not limited to, magnetic read/write devices, memory chip programmers, and other means for writing data to a particular storage device.

The communications device 106 is adapted for communicating with the programmer device 104 and the database manager 144. The user interface (UI) 110 is adapted for controlling the communications device 106 for inputting commands to the database manager 144. The UI 110 controls the display of data and the choice of commands on the display device 108.

The communications device 106 is any device suitable for the particular purpose for providing communication between the programmer device 104 and the database manager 144. Suitable communications devices include, but not limited to, cellular telephone, wireless PDA, and the personal computer with networking or wireless capability.

The display device 108 is any device suitable for the particular purpose for displaying the output from the UI 110. The display device may be found on the communications device 106, such as the display on a cellular or other mobile phone, a PDA, and a personal computer, or as a dedicated display for integrated all-in-one user hardware 100.

The user hardware 100 is adapted to facilitate making payments to the recipient hardware 120, among other things. The use of the terms user and recipient are for convenience to differentiate between the party making a payment and a party receiving a payment, respectively. It is understood that for a particular transaction, the roles of the user and recipient may be switched wherein the user becomes the party receiving the payment and the recipient becomes the party making the payment to allow for debiting and crediting.

The recipient hardware 120 is adapted to facilitate receiving and/or making payments from the user hardware 100, among other things.

The recipient hardware 120 comprises a data storage device reader 122. The recipient hardware 120 is adapted for communication with the payment processing space 160, including financial institutions 162, as well as the database manager 144 either directly or via a recipient gateway 164, such as, but not limited to a merchant account or service provider.

The data storage device 104 is adapted for communicating with the data storage device reader 122 by storing data written/programmed thereon in a readable format by the programmer device 104. The data storage device 104 communicates with the data storage device reader 122 by any suitable means, such as, but not limited to, wireless, magnetic card swipe, and radio frequency identification (RFID).

In an embodiment in accordance with the present invention, the recipient hardware 120 comprises substantially the same components as the user hardware 100 which may be the case for person-to-person transactions. In another embodiment in accordance with the present invention, the recipient hardware 120 comprises primarily a data storage device reader 122, such as, but not limited to a merchant point-of-sale terminal, but may be equipped to provide refunds, which would be a form of payment back to the user, in which case the roles of user and recipient are reversed.

The interaction of the components of the system will become clear from the embodiments of the methods and apparatus provided below.

Embodiments of the present invention provide users with a personal financial interface that allows for increased security, improved access to account information, and consolidated/streamlined procurement options. A user interface (UI) 110 provides communication directly with the database manager 144 which is in communication with the payment processing space 160, including databases at financial institutions 162, and executes write commands to a data storage device 102 providing the user with a means to execute financial transactions in a more secure, convenient and efficient manner. The process entails communication between the user interface (UI) 110 and the payment processing space 160 for real-time access to financial account activity, such as, but not limited to, balances, authorizations, and pending transactions, made available along with the ability for the user to choose a payment option for a specific transaction.

The database system 140 includes an electronic database 142 comprising user data 146, such as, but not limited to, identification and financial account information. The database 142 is stored in a location remote from the user hardware 100, such as, but not limited to, in a computer data array, and accessible by the communications device 106 over a data network, such as, but not limited to, the Internet.

A user uploads and programs or configures their identification and financial information, including, but not limited to, bank accounts, credit card accounts, utility and other revolving bills, retirement accounts, investment accounts, and other accounts via the database manager 144. In an embodiment in accordance with the present invention, these accounts are converted into a single file format using technology known in the art.

Once uploaded into the database 142 via the database manager 144, the user has control over the account data. In accordance with an embodiment of the present invention, when the database manager 144 is accessed by the user, an account status request is sent to all financial institutions 162 the user has uploaded. The database 142 is comprised of individual user accounts. Each account is linked to an account number and secured with a user defined PIN number as is known in the art.

In response, the financial institutions 162 provide real-time account information to the database manager 144, and thus the user, such as, but not limited to, balance, payment, and available credit information. The user is provided with information from which to make financial decisions, such as, but not limited to, initiating transactions between various user accounts, between a user account and a POS terminal, and between accounts of two users.

The user data 146 in the database 142 as controlled by the database manager 144 in effect becomes a digital wallet that contains information commonly found in a person's physical wallet. The user data 146 includes such things as, individually or in combination, but not limited to, credit card account information, bank account information, driver's license information, checking and savings account information, investment and retirement account information, perk and loyalty account information, and other informational and financial information. The database can also contain ancillary information such as, but not limited to, contact information and photographs.

Online database functionality and real-time consolidation of data in a database is known in the art. This technology allows for the consolidation of financial data for live account balance and activity. This information can be provided securely to a user using wired and wireless communication devices, such as, but not limited to, an individual's cellular telephone using technology inherent in the cellular service provider's network. Once the data is accessed, the information can be communicated to the card writer in communication with the communication device.

In embodiments in accordance with the present invention, wireless technology is utilized to communicate between the communications device 106 and the database manager 144. In other embodiments in accordance with the present invention, the communization is via wired connection. Using an encrypted signal the user of the communications device 106 is able to request a real-time financial overview from the database manager 144. Once a communications link has been established, the user can use the communications device 106 via the UI 110 to transfer funds between verified accounts, pay bills, and manage investments, all with real-time updates of progress.

The database system 140 comprises a means to communicate with the payment processing space 160 and log into various account providers, such as, but not limited to, financial institutions 162, for the purpose of, such as but not limited to, balance and credit inquiries and accepting deposits and withdraws from the user's accounts. This communication also includes authorization requests generated from recipient hardware 120 including, but not limited to, a data storage device reader 122, including a POS terminal. These lines of communication will be automatically opened when the user logs onto the database manager 144 and will be closed when the user logs off. In instances where communication can not be established, a default mode is provided based on the previous transaction, as will be explained further below. The database manager 144 will periodically request account information from the various user account providers, such as, but not limited to, from the issuing banks, to update the user account information so that the user data 146 in the database 142 will be current when the user logs onto the database manager 144.

In an embodiment in accordance with the present invention, once logged in, the user is able to perform account operations as if they were directly logged into a specific account. The user can assign permission to the database manager 144 to aggregate information from the account to the database.

In accordance with an embodiment of the present invention, the communications device 106 accesses the database manager 144 by means of an encrypted cellular signal. For other wireless technologies, such as, but not limited to, satellite, Bluetooth, and 820.11 networks, the communications device 106 accesses the database manager 144 by means of a secure signal suitable for the particular purpose.

Upon passing the required security steps, the communications device 106 provides the user with a comprehensive listing of accounts as loaded by the user displayed by the UI 110. This summary includes, but is not limited to, account names and balances for all accounts loaded. In addition, any membership clubs, such as, but not limited to, hotel and frequent flier programs can be displayed with current balances. Utilities and other bills can also be loaded and will be shown with due date and amount due information, for example. From the communications device 106, the user can execute a financial transaction. The user commands are transmitted to the database manager 144 via a secure signal. In return, the database manager 144 communicates to the communications device 106 account updates as they change via a secure signal. This information keeps the user up to date of all financial moves as well as giving the user the freedom to select an account to use to execute a transaction based on current information.

In accordance with an embodiment of the present invention, the user hardware 100 is controlled, and the database manager 144 is accessed, with the assistance of a user interface (UI) 110. User interfaces are a known in the art and will only be briefly described herein. The UI 110 provides an intuitive, visual and easy-to-use display of items, including, but not limited to, consolidated real-time account information, payment options, posted charges and pending charges. This allows the user real-time access to all database-posted transactions as well as current pending charges. The need for keeping track of paper receipts is eliminated, as is the need for bookkeeping. These are features of the database given its inherent property of keeping financial records because it actually assists in performing them. Because the system is only securely accessed, the threat of identity theft is extremely limited.

Figure 2:
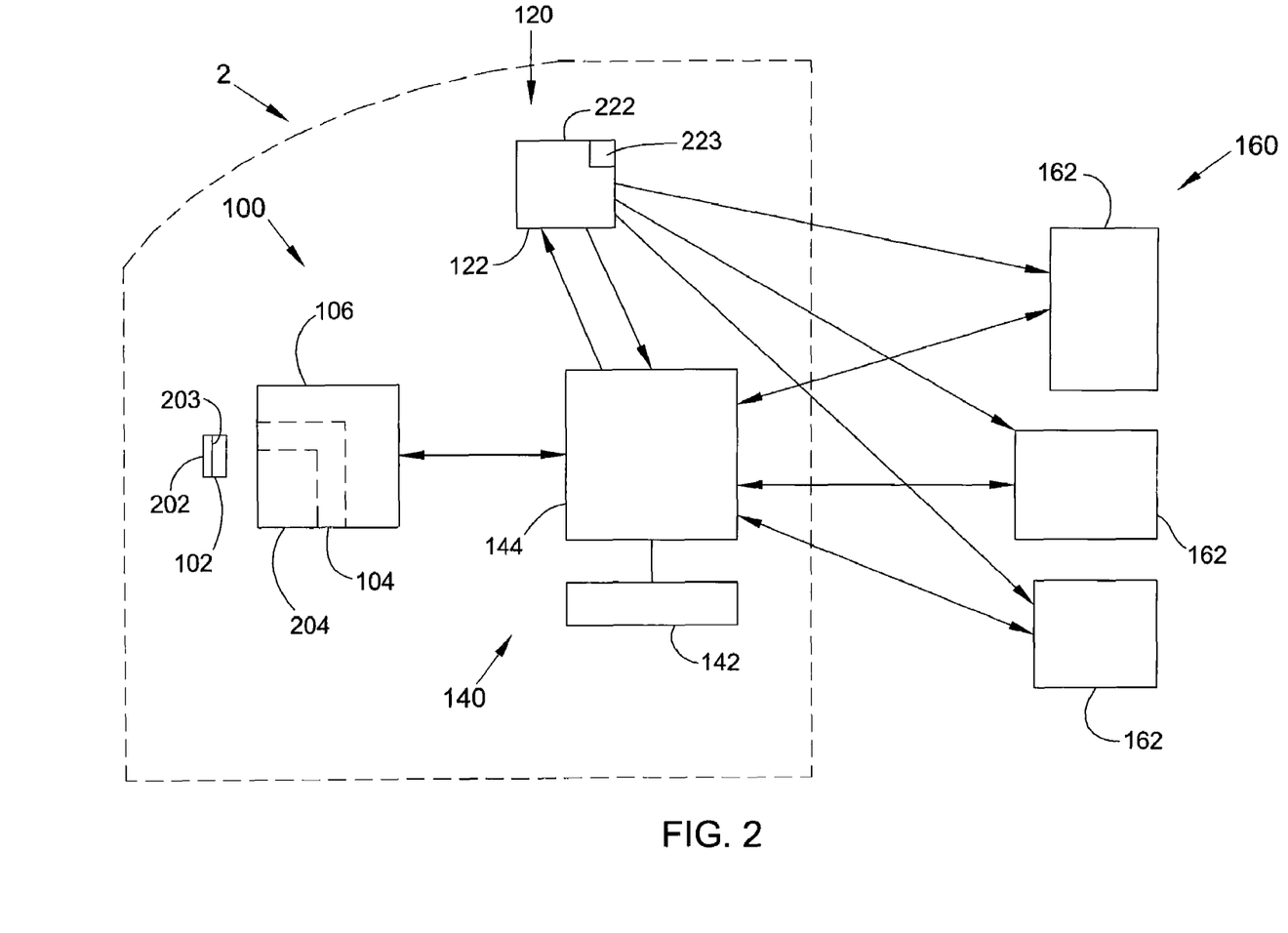
FIG. 2 is a schematic of a system for enabling secure financial transactions between a data storage device and recipient hardware, wherein the data storage device comprises a magnetic stripe card and the recipient hardware comprises a data storage device reader in the form of a point of sale terminal, in accordance with an embodiment of the present invention.

FIG. 2 is a schematic of a system 2 for enabling secure financial transactions between a data storage device 102 and recipient hardware 120, wherein the data storage device 102 comprises a magnetic stripe card 202 and the recipient hardware 120 comprises a data storage device reader 122 in the form of a point of sale (POS) terminal 222, in accordance with an embodiment of the present invention. The system 2 comprises user hardware 100, the recipient hardware 120, and a database system 140. The user hardware 100 comprises the magnetic stripe card 202, a programmer device 104 in the form of a magnetic stripe card writer 204, and a communications device 106. The system 2 is made available, for example, but not limited there to, to a user who is shopping at a merchant for goods or services who utilizes a POS terminal 222.

The user interface (UI) 110 provides communication directly with the database manager 144 which is in communication with the payment processing space 160, including databases at financial institutions 162, and executes write commands to a magnetic stripe 203 on the magnetic stripe card 202. The system 2 provides the user with a means to execute financial transactions in a more secure, convenient and efficient manner. The magnetic stripe card 202 can be used to transact with a large installed base of conventional point of sale (POS) terminals 222.

The user hardware 120 can be configured in a number of different ways suitable for a particular purpose. In an embodiment in accordance with the present invention, the system comprises a wireless communications device separate from the magnetic stripe card writer.

Figure 3A:
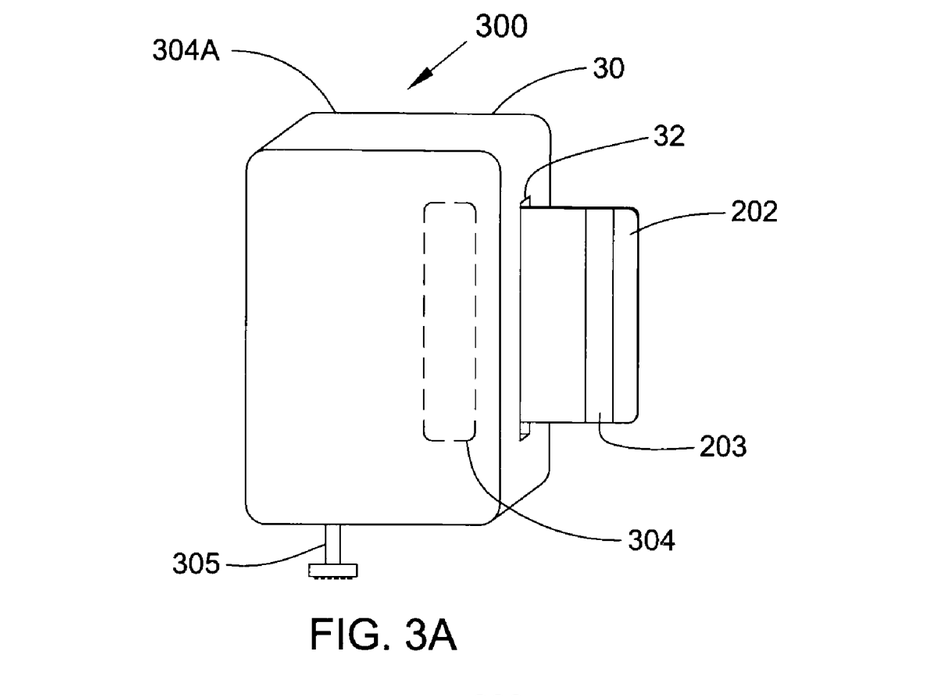
FIG. 3A is a perspective view of a programmer device 304A adapted to program a magnetic stripe card 202, in accordance with an embodiment of the present invention.

FIG. 3A is a perspective view of a programmer device 304A adapted to program a magnetic stripe card 202, in accordance with an embodiment of the present invention. The programmer device 304A comprises a case 30 having a slot 32, a magnetic writing unit 304 housed within the case 30, and a communication means 305 adapted to communicate with a communication device (not shown). The programmer device 304A adapted to accept and program the magnetic stripe card 202.

In an embodiment in accordance with the present invention, the communication means 305 is a communications device 106 adapted for wireless communication. The wireless communications device 106 is adapted to communicate wirelessly with the database manager 144. The wireless communications device 106 comprises a transceiver adapted for sending and receiving secure signals to communicate with the database manager 144, and a communication means for communication with a personal computer or other wired or wireless device.

In another embodiment in accordance with the present invention, the communication means 305 is adapted for direct hardware interconnection with a communications device (not shown), such as a cell phone, a personal digital assistant (PDA), and a handheld email device having wireless communication capability. The UI resides on the communications device and is displayed on the display that is common for many communications devices.

The magnetic stripe card 202 comprises a magnetic stripe 203 suitable for swiping in a POS terminal card reader. The magnetic stripe card 202 is adapted to enter and exit the case 30 via the slot 32. The magnetic writing unit 304A is disposed within the case 30 and adjacent the magnetic stripe 203 when the magnetic stripe card 202 is within the case 30. Means are provided for the extension and removal of the card from the case. Suitable means includes, but is not limited to, a mechanical lever and a motorized translator.

In one embodiment in accordance with the present invention, the magnetic stripe card 202 is adapted to extend from the slot 32 sufficient for swiping in a POS terminal but remain coupled to the programmer device 304A, as well as adapted to be removed from the programmer device 304A and given to a merchant and for other uses.

The magnetic writing unit 304 of the programmer device 304A is adapted to magnetically write user transaction information onto the magnetic stripe 203 suitable for the transaction and readable by a POS terminal. In another embodiment, the magnetic writing unit 304A is adapted for magnetic rewrite functionality adapted to rewrite user transaction information onto the magnetic stripe 203 so that the magnetic stripe card 202 may be reused for subsequent transactions.

Figure 3B:
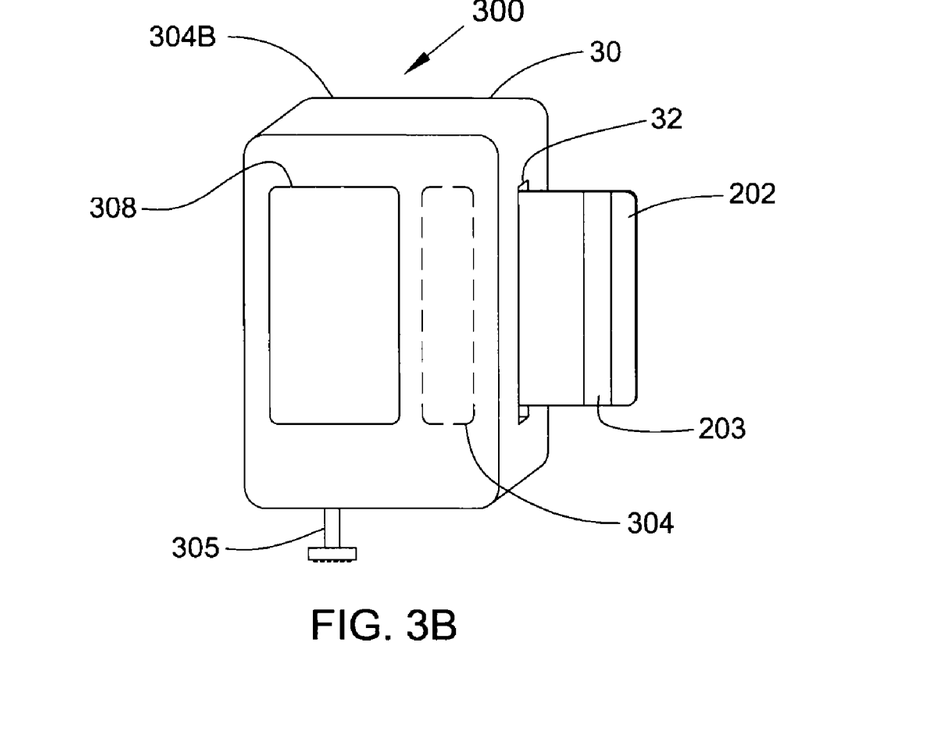
FIG. 3B is a perspective view of a programmer device 304B in accordance with another embodiment of the present invention.

FIG. 3B is a perspective view of a programmer device 304B in accordance with another embodiment of the present invention. The programmer device 304B is substantially similar to the embodiment of FIG. 3A and further comprising a display device 308, such as, but not limited to a LCD touch screen, adapted to display the UI and for data input. The embodiment of FIG. 3B provides an all-in-one user hardware 300B with built-in communications capability.

In an embodiment, the LCD is adapted to be able to distinguish a human fingerprint for biometric security purposes.

Figure 4A:
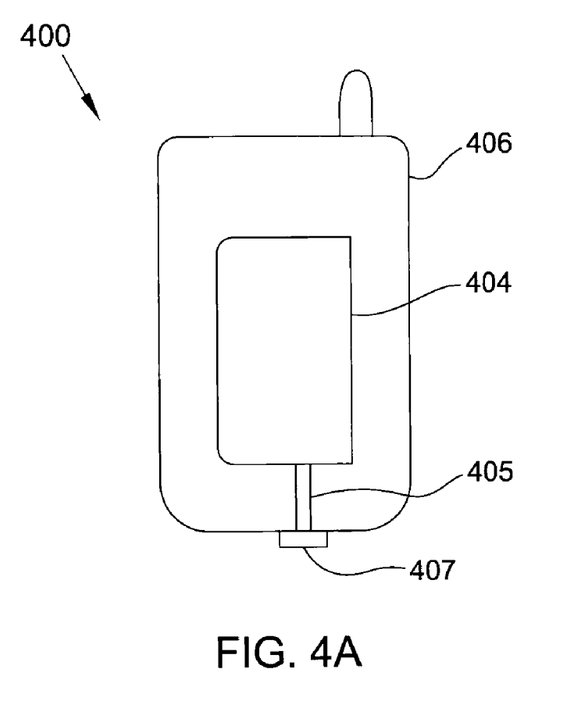
FIGS. 4A-4C are front, side, and front views of user hardware 400 comprising a programmer device 404 coupled to a cellular telephone 406, in an embodiment in accordance with the present invention.
Figure 4B:
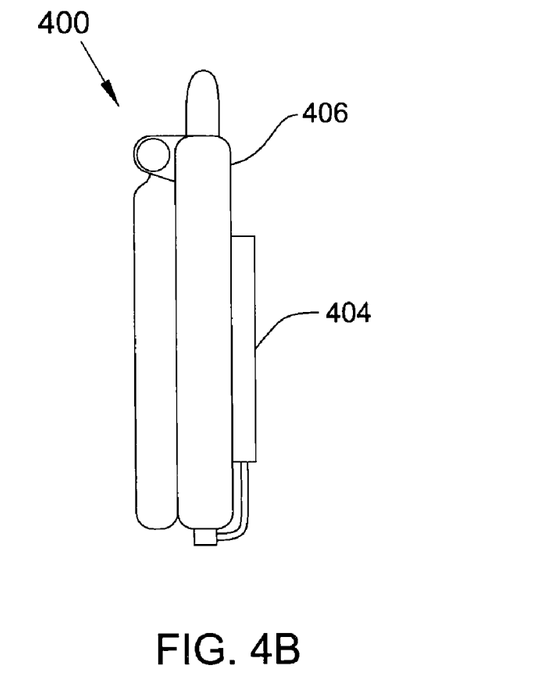
Figure 4C:
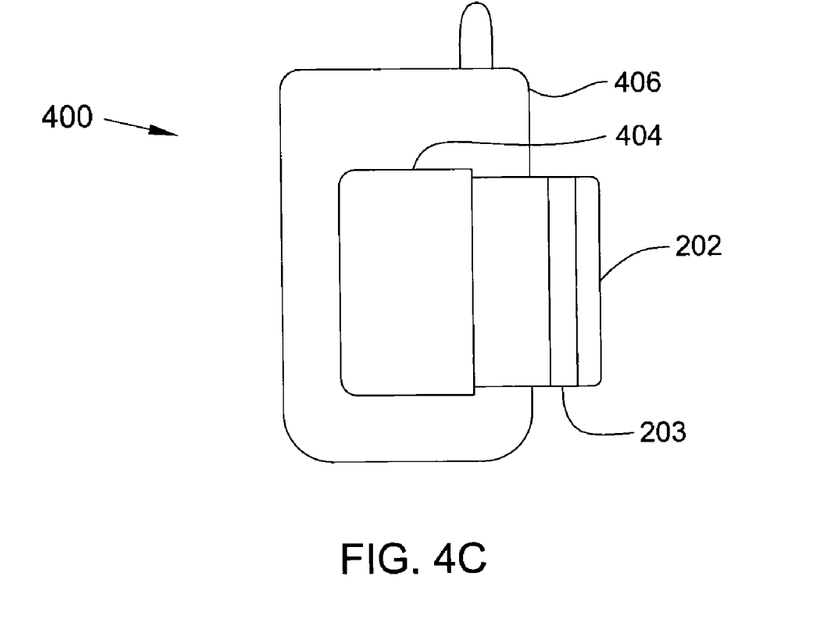

FIGS. 4A and 4B are front, side, and front views of user hardware 400 comprising a programmer device 404 coupled to a cellular telephone 406, in an embodiment in accordance with the present invention. The programmer device 404 comprises a interconnect cable 405 adapted to interconnect and communicate with the cellular telephone 406 through an available hardware interconnect port 407 on the cellular telephone 406. In an embodiment, the UI is contained on the cellular telephone 406 and is displayed on the cellular telephone display. Data input is via the keypad on the cellular telephone 406. In another embodiment, the programmer device 404 further comprises a display (not shown) and the UI resides on the programmer device 404 and displayed on the display.

In other embodiments, the programmer device 404 comprises a near-field wireless communications means such as, but not limited to, BlueTooth, and is adapted to communicate with a communications device of similar capability. The programmer device 404 and the communications device are adapted to communicate with each other, while the communications device is also adapted to communicate with the payment processing space 160.

In embodiments in accordance with the present invention, the user controls the programmer device 404 through the UI 110. With assistance of the UI 100, the user controls which financial account and/or associated perk account that the user would like to use and executes a write command to the magnetic stripe card 202. The magnetic stripe 203 on the magnetic stripe card 202 is written or programmed for the transaction and swiped in a POS terminal provided by the merchant for reading and completion of the transaction. In embodiments of the present invention, the magnetic stripe card 202 is adapted to be written for one-time usage. In other embodiments of the present invention, the magnetic stripe card 202 is adapted to be written, erased and rewritten for multiple use. By way of example only and not limited thereto, one-time usage can be beneficial to provide a third party a "gift card" for future use, or as an added form of security since that specific card can be used only for a single transaction. By way of example only, and not limited thereto, a rewritable card for multiple use can be beneficial to provide a merchant a familiar magnetic stripe card associated with standard credit card transactions, and to allow the user to carry only one card that can be programmed for one of many accounts.

As will be described further below, in some embodiments of the present invention the transaction information written to the magnetic stripe 203 does not contain personal user information that can be exploited if lost or stolen.

The magnetic stripe card 202 is adapted to be swiped through a POS terminal like any other payment card. Various transaction processes are described below. The user obtains a paperless receipt of the transaction via the UI 110. Transaction history is stored on the database 142. The user, via the UI 110, can access a log of prior transactions dating back within a predetermined time period. The digitally stored transaction data 146 allows for the elimination of paper receipts as digital receipts allow for storage of unique identifiers (user and merchant) to reference disputes, returns, or expense report purposes.

The flexibility of embodiments of the present invention allows for information to be written to the storage device 102 to control the payment. By was of example and not limited thereto, the types of information written to the storage device 102 include:

account information—that is, the storage device presents to the data storage device reader as a clone of a storage device provided by an issuing authority, such as a financial institution;

database manager account number—that is, the storage device identifies the card holder as the database manager account owner;

database manager authorization number—that is, the storage device is pre-programmed with a transaction authorization number;

time information—that is, the transaction must take place within a certain time period after the storage device is programmed;

amount information—that is, the transaction must be for a specific amount or a range of amounts;

merchant information—that is, the transaction must be with a specific merchant;

geographic area information—that is, the transaction must be performed within a geographic location; and class-of-goods information—that is, the transaction must be used for purchase within a specific class-of-goods.

Magnetic stripe technology has been proven useful for storing data and information securely on a thin magnetic stripe. This technology is currently used in nearly all credit and debit cards as well as many identification verifying devices such as badges and hotel keys. Information is placed on magnetic stripe cards through a non-invasive process which allows the information on the card to be deleted or overwritten hundreds of times without a loss in the integrity of the information being written to the card.

In conformance with current standards known in the art, the magnetic writing unit writes to one or more of the three magnetic stripe tracks that is used currently by known POS terminals. In addition to writing information on the magnetic stripe in financial card formats such as ISO 7811, 7813, and ISO 4909 for track 3, the magnetic writing unit is also capable of writing in driver license formats such as the AAMVA and CA DMV. This allows the card writer to not only be used for financial transactions but can also be used to identify and authenticate the user in any application in which a driver's license would typically be used. A low-coercivity magnetic stripe is used in an embodiment such that writing and re-writing of information on the magnetic stripe can be done with a low amount of magnetic energy.

The magnetic writing unit transforms data retrieved from the database into the necessary format for the magnetic stripe. The database manager, in addition to storing user data, also stores which formats, fields, and tracks (card meta-data) that are used for all of the user's bank's, brokerage's, and other institution's traditional financial cards, as communicated by the UI, which accesses the database manager and controls the user hardware.

In accordance with an embodiment of the present invention, a smart card comprising a magnetic stripe and an embedded memory chip is provided. Information for multiple accounts is stored in the memory chip. This allows fast rewrites which adds to the ease of use of the device. When a new account is selected via the UI, the information is transferred from the memory chip to the magnetic writing unit and the new information is written to the magnetic stripe.

The magnetic stripe card itself may be smaller than traditional magnetic stripe cards. The purpose of the magnetic stripe card is to store information on a single financial institution on the magnetic stripe and all other accounts on the embedded memory chip. The magnetic stripe card itself does not contain any visible designation of ownership or account information for security purposes.

The user hardware, and in particular the magnetic stripe card and the programmer device, works together in a number of different modes depending on the type of transaction. The modes may be selected using the UI. In an embodiment, the user hardware operates in default mode. In default mode the magnetic stripe card assumes its last rewrite command properties to allow the magnetic stripe card to be used again and again until changed. Security is lessened but default mode provides functionality for regular usage of the same account. The security is still PIN enabled but not database dependent.

In an embodiment, the user hardware operates in swipe mode. In swipe mode the magnetic stripe card is retained in the programmer device with the magnetic stripe exposed outside the case. This allows the user to swipe the magnetic stripe card at POS terminals without having to remove and replace the magnetic stripe card from the programmer device. This allows convenient access to the magnetic stripe card without the possibility of losing or leaving the magnetic stripe card at the merchant location.

In an embodiment, the user hardware operates in valet mode. In valet mode the magnetic stripe card is removed from the programmer device so that is may be given to a third party for swiping in a magnetic stripe card reader, such as a POS terminal. In valet mode the magnetic stripe card is written to authenticate one transaction from one account and the database manager notifies the financial institution to accept the next transaction only. By limiting the usability of a magnetic stripe card in valet mode, potential fraud is greatly reduced and a stolen or misplaced magnetic stripe card is rendered virtually useless. This mode is activated using the UI which alerts the financial institution to authorize only the next specified transaction request.

The flexibility of embodiments of the present invention allows for various forms of security, independently or in combination, depending on the mode of operation and the type of transaction. By was of example and not limited thereto, forms of fraud security include:

User specific—the card is writable only by the user's specific card writer, wherein the transferring of cards between devices is not permitted, but the card can be read by any POS terminal;

Swipe mode—where the card remains coupled to the programmer device, security is maintained by the user using a PIN number to access the UI and to extend the card from the slot sufficient to swipe the magnetic stripe;

Valet mode—where the card is removed from the card writer, the database accepts the next transaction authorization request and then goes into a safe mode where all authorization requests are denied and logged for possible fraud tracking, and once the card is reconnected to the handheld the safe mode is disabled; and Smart sync—where a smart card having a microchip can be smart-synced with the programmer device to validate the device holder is in fact the owner in which case the cards could be repurposed to anyone.

Figure 5:
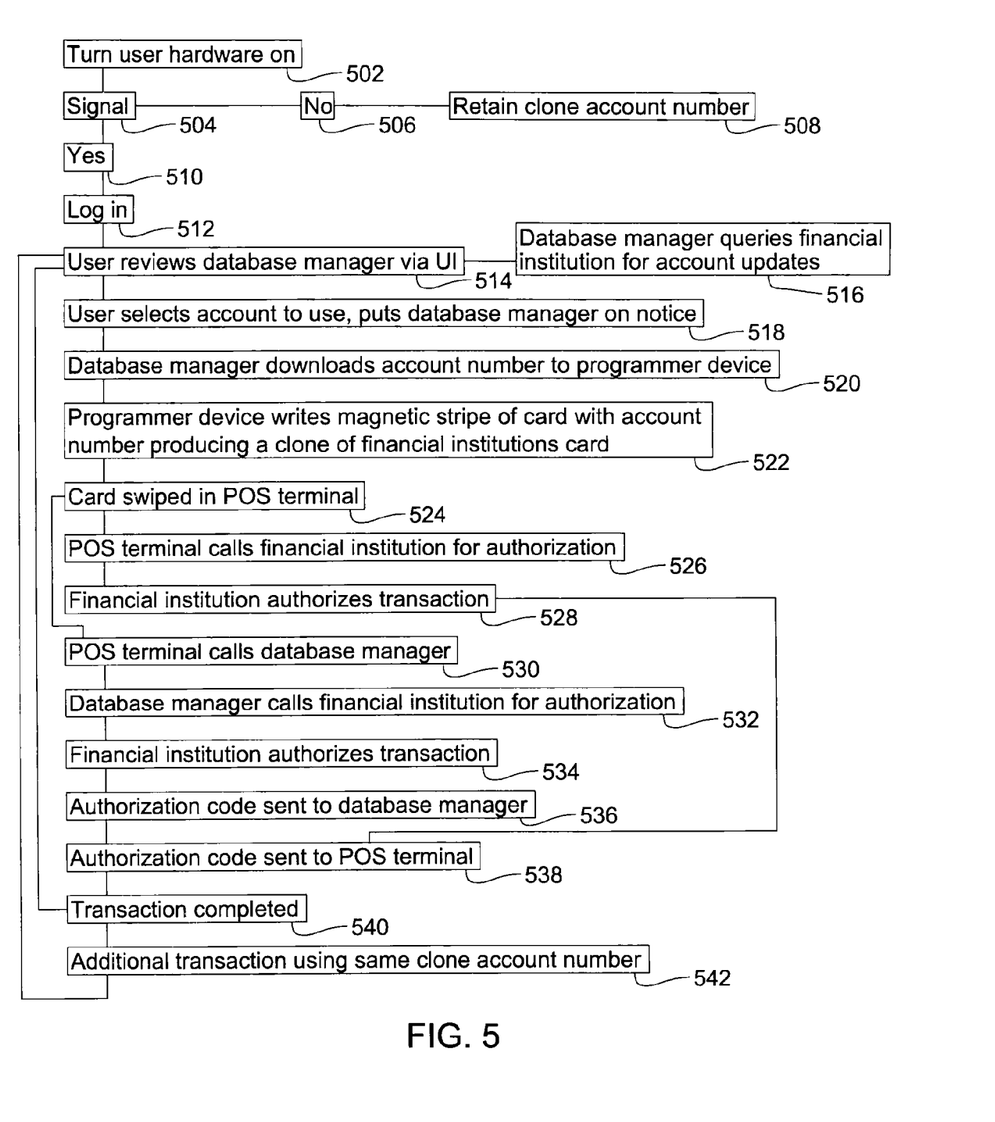
FIG. 5 is a flow chart of a method of using the system in accordance with an embodiment of the present invention.

FIG. 5 is a flow chart of a method of using the system in accordance with an embodiment of the present invention. The user logs into the database via the user interface (UI) in order to obtain the current status of one or more accounts from which a purchase may be made. The database is updated by communicating, at the time of log in and/or on a regular basis, with the user's financial institutions in order to query and update the status of the user's accounts. The user selects the account of a financial institution they wish to use to fund the purchase which will notify the database that one or more transactions from that account is about to occur or being scheduled. The database downloads the account number of the financial institution to the card writer. The account number is written on the card via the card writer effectively creating a clone of a dedicated card issued by the financial institution. The magnetic stripe is swiped in the reader of the POS terminal. The POS terminal sends an authorization request to the database to obtain authorization for the transaction. The database communicates the authorization request to the financial institution associated with the account designated by the user. The financial institution authorizes the transaction and sends an authorization code indicating that the transaction is authorized to the database. The database sends the authorization code to the POS terminal. The user then completes the transaction by following the prompts on the POS terminal. The card retains the selected account information and the database keeps the selected account as the active account until the user selects a different account via the UI. This will allow multiple POS purchases to occur without having to communicate with the database and writing to the card before each transaction. The user can then review the database to obtain account status before the next transaction. The user can use the same account for the next transaction or choose a different account which will start the process again.

In the above method, security is maintained in a number of ways. If the card remains coupled to the card writer, security is maintained by the user using a PIN number to extend the card from the slot sufficient to swipe the magnetic stripe. If the card is removed from the card writer, the card incorporates one or more electronic features, such as, but not limited to, the card is programmed for only one transaction unless returned and stowed in the card writer, the use of a PIN number at the POS terminal, and/or one or more visible identification features, such as, but not limited to, the user's name, photograph, and signature.

In another embodiment shown in FIG. 5 is a method of using the system in accordance with another embodiment of the present invention. The user logs into the database via the user interface (UI) in order to obtain the current status of one or more accounts from which a purchase may be made. The database is updated by communicating, at the time of log in and/or on a regular basis, with the user's financial institutions in order to query and update the status of the user's accounts. The user selects the account of a financial institution they wish to use to fund the purchase which will notify the database that one or more transactions from that account is about to occur or being scheduled. The database downloads the account number of the financial institution to the card writer. The account number is written on the card via the card writer effectively creating a clone of a dedicated card issued by the financial institution. The magnetic stripe is swiped in the reader of the POS terminal. The POS terminal sends an authorization request to the financial institution associated with the account designated by the user. The financial institution authorizes the transaction and sends an authorization code indicating that the transaction is authorized to the POS terminal. The user then completes the transaction by following the prompts on the POS terminal. The card retains the selected account information until the user selects a different account via the UI. This will allow multiple POS purchases to occur without having to communicate with the database and writing to the card before each transaction. The user can then review the database to obtain account status before the next transaction. The user can use the same account for the next transaction or choose a different account which will start the process again.

In the above method, security is maintained in a number of ways. If the card remains coupled to the card writer, security is maintained by the user using a PIN number to extend the card from the slot sufficient to swipe the magnetic stripe. If the card is removed from the card writer, the card incorporates one or more electronic features, such as, but not limited to, the card is programmed for only one transaction unless returned and stowed in the card writer, the use of a PIN number at the POS terminal, and/or one or more visible identification features, such as, but not limited to, the user's name, photograph, and signature.

Figure 6:
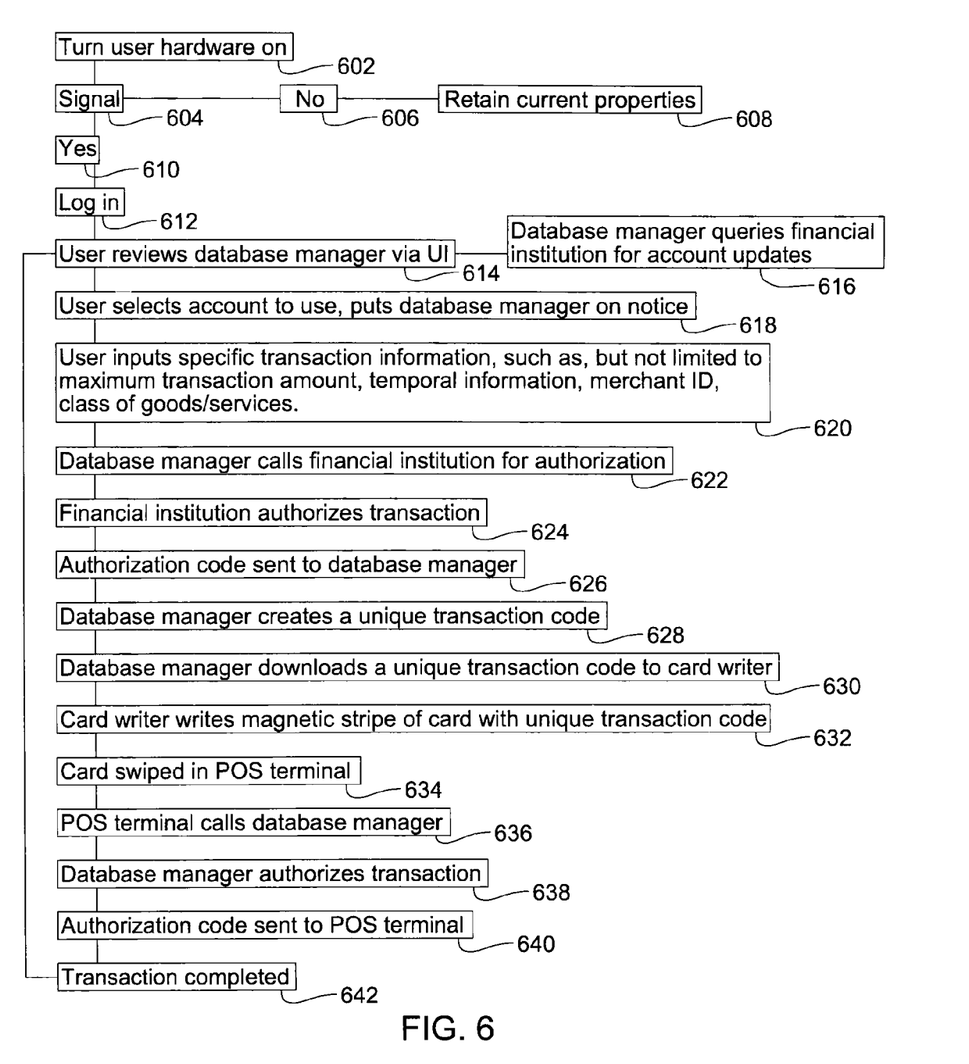
FIG. 6 is a flow chart of a method of using the system in accordance with another embodiment of the present invention.

FIG. 6 is a flow chart of a method of using the system in accordance with another embodiment of the present invention. The user logs into the database via the user interface (UI) in order to obtain the current status of one or more accounts from which a purchase may be made. The database is updated by communicating, at the time of log in and/or on a regular basis, with the user's financial institutions in order to query and update the status of the user's accounts. The user selects the account of a financial institution they wish to use to fund the purchase which will notify the database that a transaction from that account is about to occur or being scheduled. The user uses the UI to send specific transaction information to the database so as to identify the transaction and request authorization for it. The specific transaction information includes, such as, but not limited to, one or more of transaction amount, maximum transaction amount, temporal information regarding when the transaction will take place, merchant ID, and class of goods. This added security measure prevents the use of the card for any but the specific transaction being requested. The database communicates an authorization request to the financial institution associated with the account designated by the user. The financial institution authorizes the transaction and sends an authorization code indicating that the transaction is authorized to the database. This effectively preauthorizes the transaction. The database generates a unique transaction code to identify the transaction which is distinct from the financial institution's account number and the database account number. The database downloads the unique transaction code to the card writer. The unique transaction code is written on the card via the card writer. This added security measure prevents the disclosure of the user's account number from a lost or stolen card as only the unique authorization code for a predetermined amount is exchanged. The magnetic stripe is swiped in the reader of the POS terminal. The POS terminal sends an authorization request to the database to obtain authorization for the transaction. The database sends the authorization code to the POS terminal. The user then completes the transaction by following the prompts on the POS terminal. The process is repeated for the next transaction.

Multiple transactions may be preauthorized in this fashion in embodiments where the card comprises multiple magnetic stripes.

In the above method, security is maintained in a number of ways. If the card remains coupled to the card writer, security is maintained by the user using a PIN number to extend the card from the slot sufficient to swipe the magnetic stripe. If the card is removed from the card writer, the card is programmed for only one specific transaction. No visible identification features are necessary to ensure against fraud.

Figure 7:
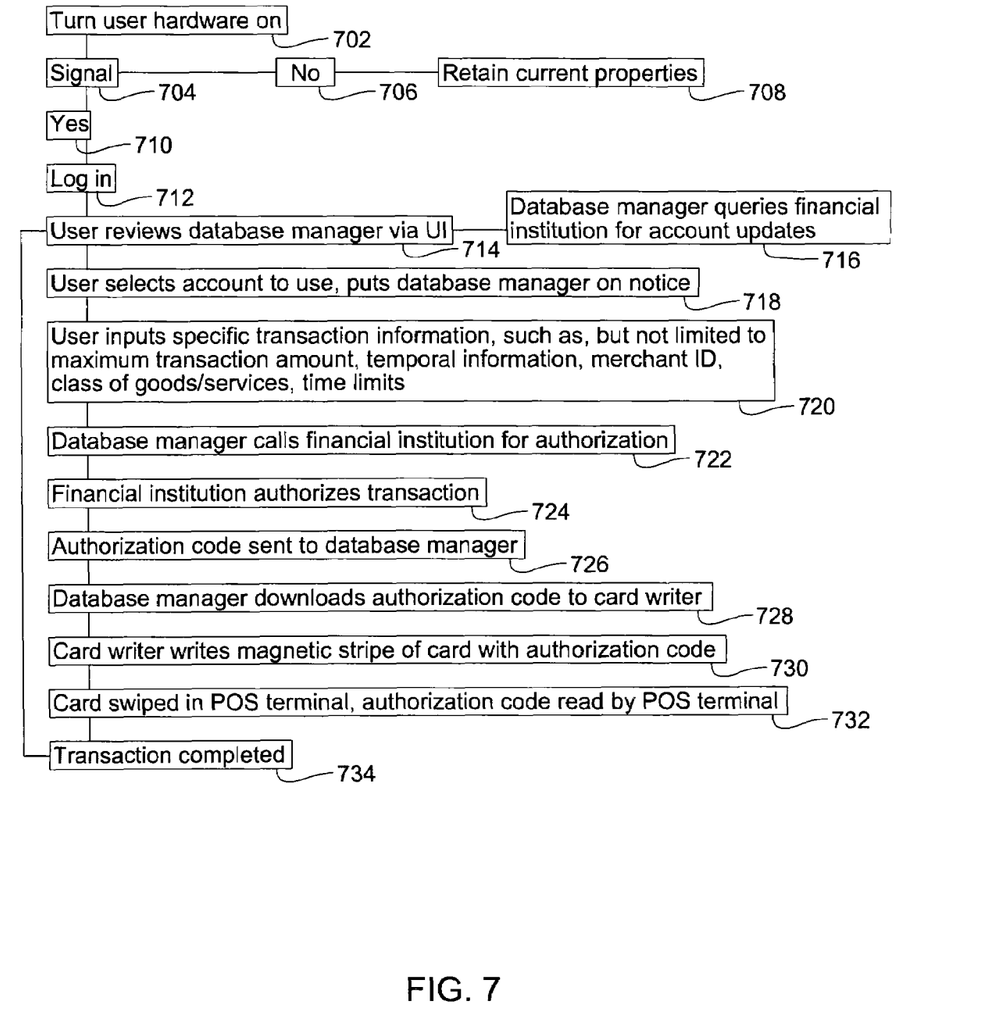
FIG. 7 is a flow chart of a method of using the system in accordance with another embodiment of the present invention.

FIG. 7 is a flow chart of a method of using the system in accordance with another embodiment of the present invention. The user logs into the database via the user interface (UI) in order to obtain the current status of one or more accounts from which a purchase may be made. The database is updated by communicating, at the time of log in and/or on a regular basis, with the user's financial institutions in order to query and update the status of the user's accounts. The user selects the account of a financial institution they wish to use to fund the purchase which will notify the database that a transaction from that account is about to occur or being scheduled. The user uses the UI to send specific transaction information to the database so as to identify the transaction and request authorization for it. The specific transaction information includes, such as, but not limited to, one or more of the transaction amount, maximum transaction amount, temporal information regarding when the transaction will take place, merchant ID, and class of goods. This added security measure prevents the use of the card for any but the specific transaction being requested. The database communicates an authorization request to the financial institution associated with the account designated by the user. The financial institution authorizes the transaction and sends an authorization code indicating that the transaction is authorized to the database. This effectively preauthorizes the transaction. The database downloads the authorization code to the card writer. The authorization code is written on the card via the card writer. This added security measure prevents the disclosure of the user's account number from a lost or stolen card. The magnetic stripe is swiped in the reader of the POS terminal which reads the authorization code. The user then completes the transaction by following the prompts on the POS terminal. The process is repeated for the next transaction.

In the above method, security is maintained in a number of ways. If the card remains coupled to the card writer, security is maintained by the user using a PIN number to extend the card from the slot sufficient to swipe the magnetic stripe. If the card is removed from the card writer, the card is programmed for only one specific transaction. No visible identification features are necessary to ensure against fraud.

Figure 8:
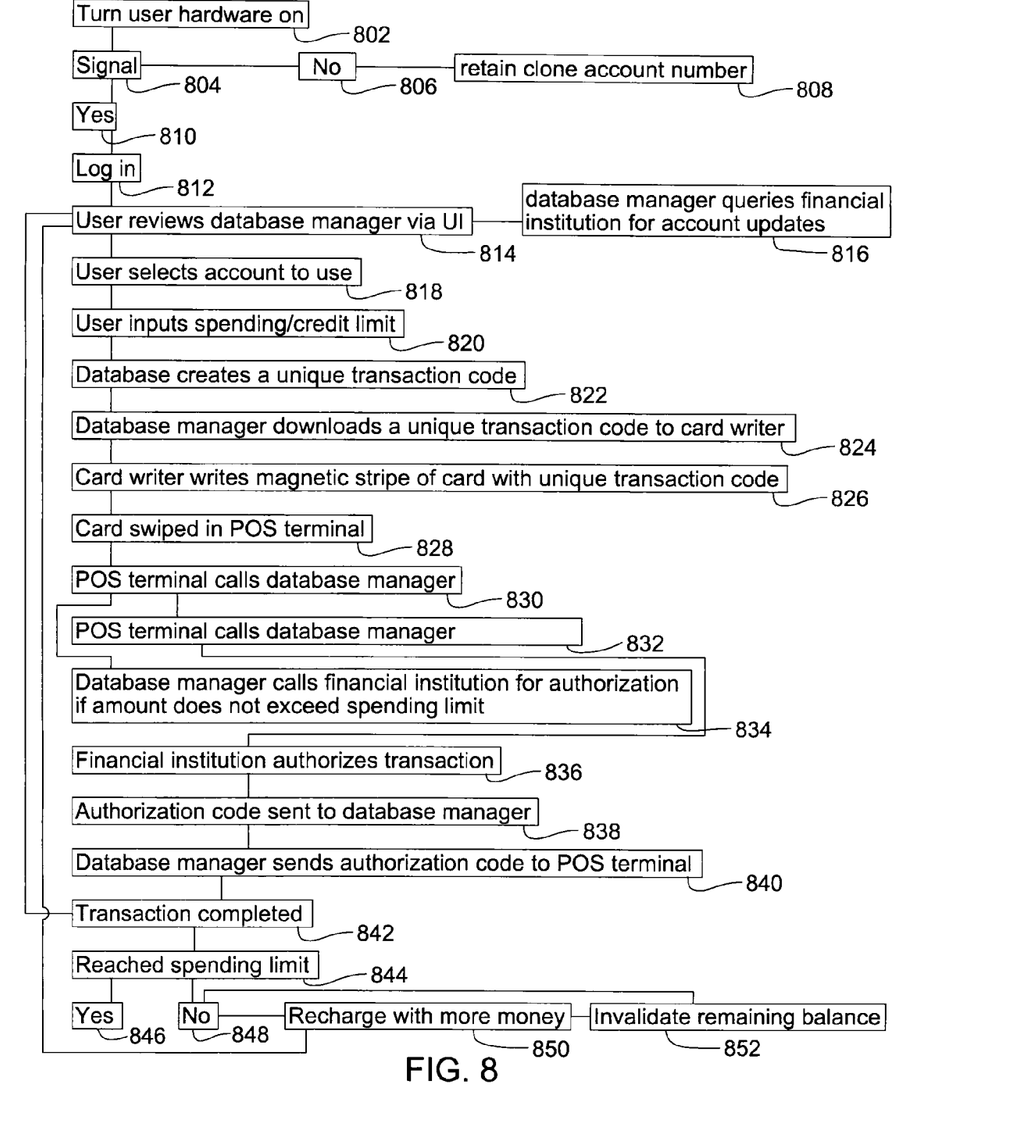
FIG. 8 is a flow chart of a method of using the system in accordance with another embodiment of the present invention.

FIG. 8 is a flow chart of a method of using the system in accordance with another embodiment of the present invention. The user logs into the database via the user interface (UI) in order to obtain the current status of one or more accounts from which a purchase may be made. The database is updated by communicating, at the time of log in and/or on a regular basis, with the user's financial institutions in order to query and update the status of the user's accounts. The user selects the account of a financial institution they wish to use to fund the purchase which will notify the database that a transaction from that account is about to occur or being scheduled. The user uses the UI to identify a specific spending or credit limit for the card. This added security measure prevents the use of the card for more than the specific spending limit. The database generates a unique transaction code to identify the transaction which is distinct from the financial institution's account number and the database account number. The database downloads the unique transaction code to the card writer. The unique transaction code is written on the card via the card writer. This added security measure prevents the disclosure of the user's account number from a lost or stolen card. The magnetic stripe is swiped in the reader of the POS terminal. The POS terminal sends an authorization request to the database to obtain authorization for the transaction. If the spending limit is exceeded, the authorization is denied. If the spending limit is not exceeded, the database communicates the authorization request to the financial institution associated with the account designated by the user. The financial institution authorizes the transaction and sends an authorization code indicating that the transaction is authorized to the database. The database sends the authorization code to the POS terminal. The user then completes the transaction by following the prompts on the POS terminal.

If the spending limit is reached, the user can reuse the card by repeating the process. If the spending limit is not reached, the user can use the card for another transaction, increase the spending limit of the card, or invalidate the remaining balance. To use the card in another transaction, the card is swiped in a POS terminal and the authorization process is repeated. To increase the spending limit, the process is repeated by reviewing the database via the UI. The user can invalidate the remaining spending limit via the UI.

In the above method, security is maintained in a number of ways. If the card remains coupled to the card writer, security is maintained by the user using a PIN number to extend the card from the slot sufficient to swipe the magnetic stripe. If the card is removed from the card writer, security is provided by limiting the spending limit and by the ability to invalidate the balance using the UI if the card is lost or stolen.

Person to person transfers may be transacted in a number of ways. A user may transfer funds to another user by means of short wave transmissions such as Bluetooth or RF. To execute a user-to-user transfer both users must choose to send or receive funds along with denoting the exact amount to send or receive. The users will confirm the other user as the individual with whom they are trying to communicate and then funds will transfer after both parties accept.

The individual database can create unique transaction authorizations for a specific accounts and amounts, because of this capability and also the ability to communicate with specific financial institutions it should also post new approvals. The UI can accept third party database authorizations and post that do the specific account for person to person capability.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A transaction method comprising:
   communicating with a database comprising user data;
   selecting a payment account;

programming a data storage device with payment account information; and communicating the payment account information from the data storage device to a data storage device reader;

wherein communicating with a database of user data comprises:

activating a communications device;

communicating with a database manager;

wherein selecting a payment account comprises:

retaining the properties of a magnetic stripe card to a previous rewrite state if no communication with the database manager;

logging into the database manager via a user interface (UI);

obtaining a current status of one or more accounts from which a payment may be made, the database updated by the database manager communicating with the user's financial institutions in order to query and update the status of the user's accounts;

selecting an account of a financial institution the user wishes to use to fund the payment, notifying the database manager that one or more transactions from that account is being scheduled;

wherein programming data storage device with payment account information comprises:

inputting specific transaction information into the UI in communication with the database manager;

communicating an authorization request from the database manager to the financial institution associated with the account designated by the user;

authorizing the transaction and creating an authorization code;

downloading the authorization code to the database manager;

downloading the authorization code to the card writer;

writing the authorization code on the magnetic stripe via the card writer;

wherein communicating the payment account information from the data storage device to a data storage device reader comprises:

swiping the magnetic stripe in the magnetic stripe card reader communicating the authorization from the card to the magnetic stripe card reader; and completing the transaction following the prompts on the POS terminal.

2. A transaction method comprising:

communicating with a database comprising user data;

selecting a payment account;

programming a data storage device with payment account information; and communicating the payment account information from the data storage device to a data storage device reader;

wherein communicating with a database of user data comprises:

activating a communications device;

communicating with a database manager;

wherein selecting a payment account comprises:

retaining the properties of a magnetic stripe card to a previous rewrite state if no communication with the database manager;

logging into the database manager via a user interface (UI);

obtaining a current status of one or more accounts from which a payment may be made, the database updated by the database manager communicating with the user's financial institutions in order to query and update the status of the user's accounts;

selecting an account of a financial institution the user wishes to use to fund the payment, notifying the database manager that one or more transactions from that account is being scheduled;

wherein programming data storage device with payment account information comprises:

inputting a payment limit;

creating a unique transaction code;

communicating the unique transaction code to the card writer;

communicating the unique transaction code to the magnetic stripe; and wherein communicating the payment account information from the data storage device to a data storage device reader comprises:

swiping the magnetic stripe in the magnetic stripe card reader;

communicating an authorization request from the magnetic card reader to the database manager obtaining authorization for the transaction, denying the transaction if the payment limit is exceeded, authorizing the transaction and sending an authorization code indicating that the transaction is authorized to the database manager;

communicating the authorization code to the magnetic card reader; and completing the transaction following the prompts on the POS terminal.

3. A transaction method comprising:

communicating with a database comprising user data via a database manager;

obtaining a current status of one or more payment accounts from which a payment may be made wherein the database manager communicates with a user's financial institution to query and update payment account information of the payment accounts;

programming a data storage device with payment account information;

selecting a payment account from the user data;

communicating specific transaction information into the data storage device;

communicating the specific transaction information from the data storage device to the database manager;

communicating an authorization request from the database manager to the financial institution associated with the account designated by the user;

authorizing the transaction;

communicating an authorization code to the database manager;

communicating the authorization code to the data storage device, the data storage device including a card writer;

storing the authorization code on a magnetic stripe using the card writer;

communicating the authorization code from the magnetic stripe to a magnetic card reader; and authorizing the transaction.

4. A transaction method comprising:

communicating with a database comprising user data via a database manager;

obtaining a current status of one or more payment accounts from which a payment may be made wherein the database manager communicates with a user's financial institution to query and update payment account information of the payment accounts;

programming a data storage device with payment account information including a payment limit;

selecting a payment account from the user data;

creating a unique transaction code based at least in part on the payment account and the payment limit;

communicating the unique transaction code to the data storage device, the data storage device including a card writer;

storing the unique transaction code on a magnetic stripe using the card writer;

communicating the unique transaction code from the magnetic stripe to a magnetic card reader;

communicating an authorization request comprising the unique transaction code from the magnetic card reader to the database manager obtaining authorization for the transaction, denying the transaction if the payment limit is exceeded, authorizing the transaction if the payment limit is not exceeded and sending an authorization code indicating that the transaction is authorized to the database manager;

communicating the authorization code to the magnetic card reader; and authorizing the transaction.

* * * * *